(12) United States Patent
Tsubaki et al.

(10) Patent No.: US 10,108,224 B2
(45) Date of Patent: Oct. 23, 2018

(54) PORTABLE INFORMATION APPARATUS

(71) Applicant: NEC PERSONAL COMPUTERS, LTD., Tokyo (JP)

(72) Inventors: Rei Tsubaki, Tokyo (JP); Hidetaka Umetsu, Tokyo (JP); Tsuyoshi Taira, Tokyo (JP)

(73) Assignee: NEC PERSONAL COMPUTERS, LTD., Tokyo (JP)

( * ) Notice: Subject to any disclaimer, the term of this patent is extended or adjusted under 35 U.S.C. 154(b) by 0 days.

(21) Appl. No.: 15/872,390

(22) Filed: Jan. 16, 2018

(65) Prior Publication Data

US 2018/0210499 A1 Jul. 26, 2018

(30) Foreign Application Priority Data

Jan. 24, 2017 (JP) .................................. 2017-10186

(51) Int. Cl.
| | |
|---|---|
| *G06F 1/16* | (2006.01) |
| *H01Q 1/22* | (2006.01) |
| *E05D 3/12* | (2006.01) |
| *E05D 7/00* | (2006.01) |
| *E05D 11/00* | (2006.01) |

(52) U.S. Cl.
CPC ............ *G06F 1/1616* (2013.01); *E05D 3/12* (2013.01); *E05D 7/00* (2013.01); *E05D 11/0081* (2013.01); *G06F 1/1681* (2013.01); *G06F 1/1698* (2013.01); *H01Q 1/2266* (2013.01); *E05Y 2900/606* (2013.01); *G06F 1/1637* (2013.01); *G06F 1/1662* (2013.01); *H01Q 1/2291* (2013.01)

(58) Field of Classification Search
CPC ..... G06F 1/1616; G06F 1/1618; G06F 1/1681
See application file for complete search history.

(56) References Cited

U.S. PATENT DOCUMENTS

| | | | |
|---|---|---|---|
| 8,416,561 B2 * | 4/2013 | Hamada ................ | G06F 1/1635 361/679.26 |
| 2010/0067186 A1 * | 3/2010 | Aya ...................... | G06F 1/1616 361/679.28 |

(Continued)

FOREIGN PATENT DOCUMENTS

JP 2016110588 A 6/2016

*Primary Examiner* — Anthony Q Edwards
(74) *Attorney, Agent, or Firm* — Shimokaji IP (57) ABSTRACT

A portable information apparatus is capable of ensuring communication quality of an antenna device while avoiding issues of a reduction in appearance quality, an increase in cost and so forth. The portable communication apparatus is configured that a main body chassis and a display chassis are coupled together via a hinge device to be openable/closable. The hinge device includes a hinge chassis having a sectional shape whose longitudinal direction extends along a direction that the respective chassis mutually overlap in a state of overlappingly closing the respective chassis and hinge shafts which respectively couple together one of the chassis and the hinge chassis and together the other of the chassis and the hinge chassis to be rotatable. An antenna device having an antenna element is housed and fixed in the hinge chassis and the antenna element is disposed in a posture of being inclined relative to a longitudinal direction of the sectional shape of the hinge chassis.

9 Claims, 8 Drawing Sheets (56) References Cited

U.S. PATENT DOCUMENTS

2015/0355680 A1* 12/2015 Yamazaki ............ G06F 1/1616
  361/679.27
2018/0184535 A1* 6/2018 Katsuyama ........... G06F 1/1654

* cited by examiner

PORTABLE INFORMATION APPARATUS

FIELD OF THE INVENTION

The present invention relates a portable information apparatus wherein two chassis are coupled together via a hinge device to be openable/closable.

BACKGROUND OF THE INVENTION

In the portable information apparatus such as a Laptop personal computer (a Laptop PC), there is a configuration that a display chassis is coupled to a main body chassis via the hinge device to be openable/closable. In addition, there also exists a so-called convertible PC that the display chassis is made rotationally movable relative to the main body chassis up to 360 degrees, exceeding 180 degrees.

In such a portable information apparatus as described above, utilization of various wireless communications such as a wireless LAN (Local Area Network), a wireless WAN (Wide Area Network) and so forth is generally performed. It is necessary to dispose an antenna device for wireless communication by leaving a certain space between the antenna device and a conductor such as a metal and so forth. Incidentally, in the portable information apparatuses such as the Laptop PC, the convertible PC and so forth, the display chassis and the main body chassis are configured to be rotationally moved relatively. Accordingly, it is necessary for the antenna device to be loaded on each of the above-described portable information apparatuses to have the ability to typically ensure stable communication quality without being influenced by an opening/closing angle of the display chassis.

For example, in Patent Document 1, there is disclosed the convertible PC of a configuration that the antenna device is disposed on a front-end part of the display chassis which is opposite to a rear-end part on the hinge side thereof. In this configuration, the front-end part of the display chassis with the antenna device being disposed gets out of position relative to a front-end part of the main body chassis in a tablet mode in which the main body chassis and the display chassis are set to a 360-degree position and thereby the communication quality of the antenna device is typically ensured.

[Patent Document 1] Japanese Patent Application Laid-Open No. 2016-110588

SUMMARY OF THE INVENTION

As described above, in the configuration of Patent Document 1, the antenna device is disposed on the front end of the display chassis. Accordingly, it is necessary to configure a resinous bezel member which covers a peripheral edge of the display device to have a certain width for the purpose of separating the antenna device from the conductor such as the display device and so forth and thereby ensuring the communication quality of the antenna device. Therefore, there is a possibility that appearance quality of the portable information apparatus may be lowered.

In addition, in a case of configuring in such a manner that the front ends of the display chassis and the main body chassis do not get mutually out of position in the tablet mode unlike the configuration of the above-described Patent Document 1, it is necessary to secure a resinous part and so forth which does not exert influence on the communication quality also on the front end of the main body chassis. Therefore, there is a possibility that issues of an increase in manufacturing cost, a reduction in chassis strength of each chassis, a reduction in appearance quality of the portable information apparatus and so forth may occur.

The present invention has been made in view of the above-described issues of related art and aims to provide a portable information apparatus capable of ensuring the communication quality of the antenna device while avoiding the issues of the increase in manufacturing cost, the reduction in chassis strength of each chassis, the reduction in appearance quality of the portable information apparatus and so forth.

A portable information apparatus according to the first aspect of the present invention is the portable information apparatus that a first chassis and a second chassis are coupled together via a hinge device to be openable/closable. The hinge device includes a hinge chassis having a sectional shape whose longitudinal direction extends along a direction that the first chassis and the second chassis mutually overlap in a state of being overlappingly closed, and at least one hinge shaft which couples together at least one of the first chassis and the second chassis and the hinge chassis to be rotatable, and an antenna device which has an antenna element is housed and disposed in the hinge chassis, and the antenna element is disposed in a posture of being inclined relative to the longitudinal direction of the hinge chassis.

According to such a configuration as described above, the antenna element is disposed in the posture of being inclined relative to the longitudinal direction of the sectional shape of the hinge chassis and thereby it is possible to typically secure the space which is larger than a predetermined space between the antenna element and hinge chassis irrespective of an opening/closing angle between the first and second chassis. Thereby, it is possible to ensure the communication quality of the antenna device. In addition, it becomes unnecessary to dispose the antenna device, for example, in the front-end part of one of the chassis by disposing the antenna device in the hinge device. Consequently, for example, in the chassis provided with the display device, it is possible to configure a bezel member which surrounds the peripheral edge of the display device as narrow as possible and thereby the appearance quality of the product (the portable information apparatus) is improved. Further, the antenna device is disposed in the hinge device and therefore the antenna device does not overlap each chassis in the tablet mode. Consequently, it is not necessary to secure a nonconductor part for ensuring the communication quality of the antenna device on each chassis. Thereby, it is possible to avoid the increase in manufacturing cost, the reduction in chassis strength of each chassis, the reduction in appearance quality of the portable information apparatus and so forth.

The portable information apparatus may be also configured so that the hinge device has a first hinge shaft which couples together the first chassis and the hinge chassis to be rotatable, and a second hinge shaft which couples together the second chassis and the hinge chassis to be rotatable, and the antenna element is disposed in a posture of being inclined relative to a direction that the first hinge shaft and the second hinge shaft are disposed side by side. That is, in a case where the shape of the hinge device having the two-shaft structure is to be made small, the cross-section thereof is formed into the shape whose longitudinal direction extends in the direction that the respective hinge shafts are disposed side by side. Therefore, it is possible to dispose the antenna device in the hinge chassis while ensuring the communication quality by disposing the antenna element in the posture of being inclined relative to the direction that the hinge shafts are disposed side by side.

The portable information apparatus may be also configured so that the first chassis and the second chassis have flat-plate shapes which extend in front-back directions from ends on the hinge device side toward ends on the opposite side, and the antenna element is disposed in a posture of being inclined relative to the front-back directions of the first chassis and the second chassis in a state where the first chassis and the second chassis are set to a 90-degree position so that the mutual front-back directions of the first chassis and the second chassis are orthogonal to each other. Thereby, it is possible to secure with ease the space which is larger than the predetermined space between the antenna element and each chassis irrespective of the opening/closing angle between the first and second chassis, and it is possible to ensure the sufficient communication quality of the antenna device.

The portable information apparatus may be also configured so that the first chassis is a main body chassis having a keyboard device, the second chassis is a display chassis having a display device, the hinge device has the hinge shaft which couples together at least the display chassis and the hinge chassis to be rotatable, and the antenna element is disposed at a position which is closer to the display chassis than to the main body chassis in the hinge chassis. That is, in the Laptop PC and the convertible PC which have each the display chassis provided with the display device and the main body chassis provided with the keyboard device, in general, the main body chassis is placed on a desktop and so forth, and the display chassis is disposed upright on the main body chassis in a notes mode. Accordingly, it is possible to dispose the antenna element at a position separated from the desktop and so forth which serves as a ground face of the portable information apparatus concerned by disposing the antenna element at the position which is close to the display chassis which is disposed on the main body chassis. Thereby, it is possible to improve the communication quality of the antenna device.

The portable information apparatus may be also configured so that the antenna device has a ground element and the ground element is disposed at a position which is closer to the main body chassis than to the display chassis in the hinge chassis. Thereby, it is possible to dispose the ground element at the position which is close to the desktop and so forth which serves as the ground face, and it is possible to improve the communication quality of the antenna device.

The portable information apparatus may be also configured so that a holder component which holds the antenna device is housed and fixed in the hinge chassis, and the holder component has a support face which is disposed in a state of being inclined relative to the longitudinal direction of the hinge chassis, and the antenna element is fixed to the support face. Then, it is possible to surely fix the antenna device in a desirable posture in the hinge chassis.

The portable information apparatus may be also configured so that a holder component adapted to hold the antenna device is housed and fixed in the hinge chassis, the holder component has a first support face which is disposed in a state of being inclined relative to the longitudinal direction of the hinge chassis, and a second support face which is provided contiguously to the first support face and at least part of which is disposed along the longitudinal direction of the hinge chassis, and the antenna element is fixed to the first support face, and the ground element is fixed to the second support face.

A portable information apparatus according to the second aspect of the present invention is the portable information apparatus configured so that a first chassis and a second chassis are coupled together via a hinge device to be openable/closable. The hinge device includes a hinge chassis, a first hinge shaft which couples together the first chassis and the hinge chassis to be rotatable, and a second hinge shaft which couples together the second chassis and the hinge chassis to be rotatable, and an antenna device having an antenna element is housed and fixed in the hinge chassis, and the antenna element is disposed in a posture of being inclined relative to a direction that the first hinge shaft and the second hinge shaft are disposed side by side.

A portable information apparatus according to the third aspect of the present invention is the portable information apparatus configured so that a first chassis and a second chassis are coupled together via a hinge device to be openable/closable. The hinge device includes a hinge chassis, a first hinge shaft which couples together the first chassis and the hinge chassis to be rotatable, and a second hinge shaft which couples together the second chassis and the hinge chassis to be rotatable, the first chassis and the second chassis have flat-plate shapes which extend in front-back directions from ends on the hinge device side toward ends on the opposite side, and an antenna device having an antenna element is housed and fixed in the hinge chassis, and the antenna element is disposed in a posture of being inclined relative to the front-back directions of the first chassis and the second chassis in a state where the first chassis and the second chassis are set to a 90-degree position that the mutual front-back directions of the first chassis and the second chassis are orthogonal to each other.

The above-described aspects of the present invention are able to ensure the communication quality of the antenna device while avoiding the issues of the increase in manufacturing cost, the reduction in chassis strength of each chassis, the reduction in appearance quality of the portable information apparatus and so forth.

DETAILED DESCRIPTION OF THE INVENTION

In the following, a portable information apparatus according to the present invention will be described by giving preferred embodiments with reference to the appended drawings.

Figure 1:
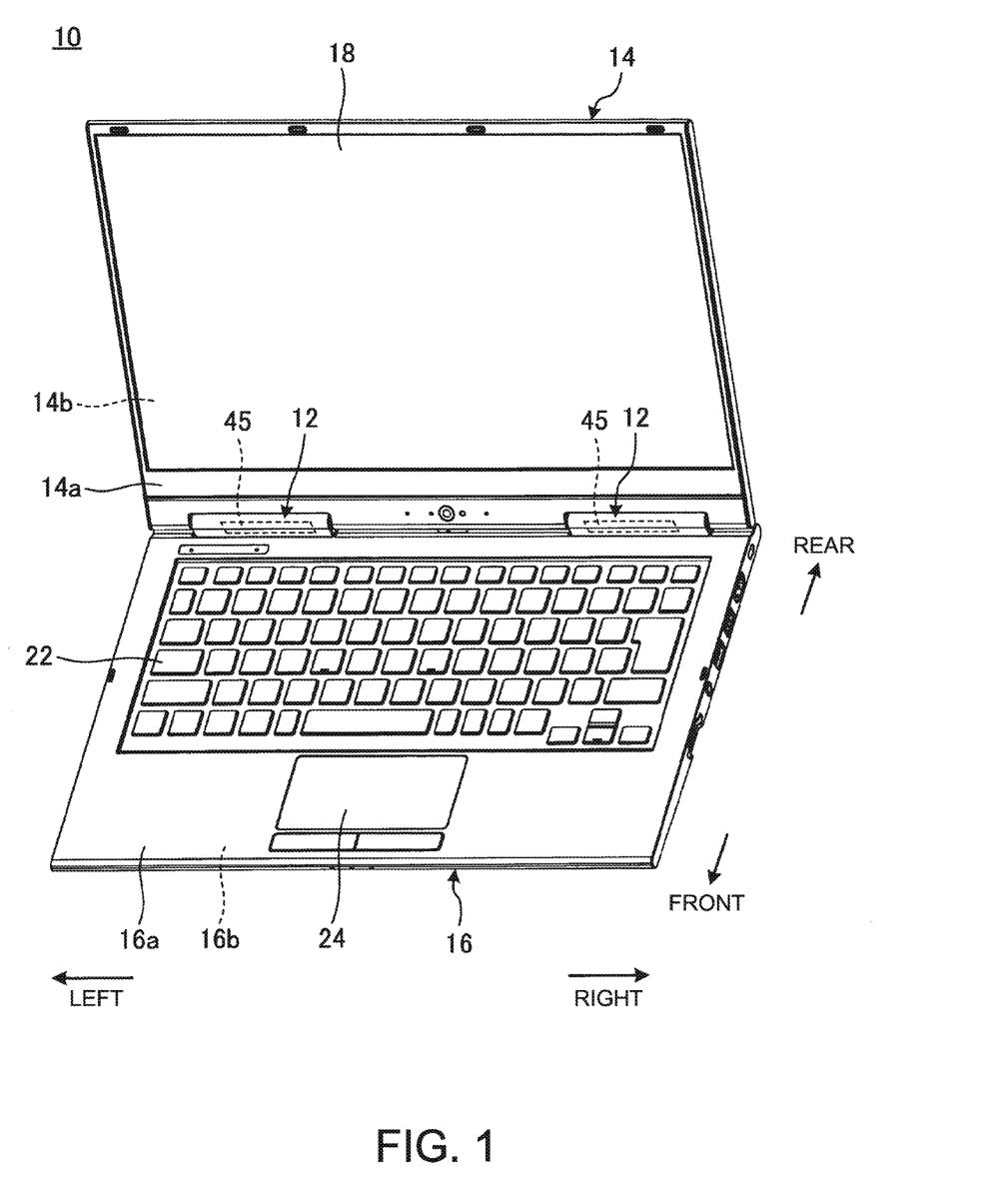
FIG. 1 is a perspective view illustrating one example of a portable information apparatus according to one embodiment of the present invention.
Figure 2A:
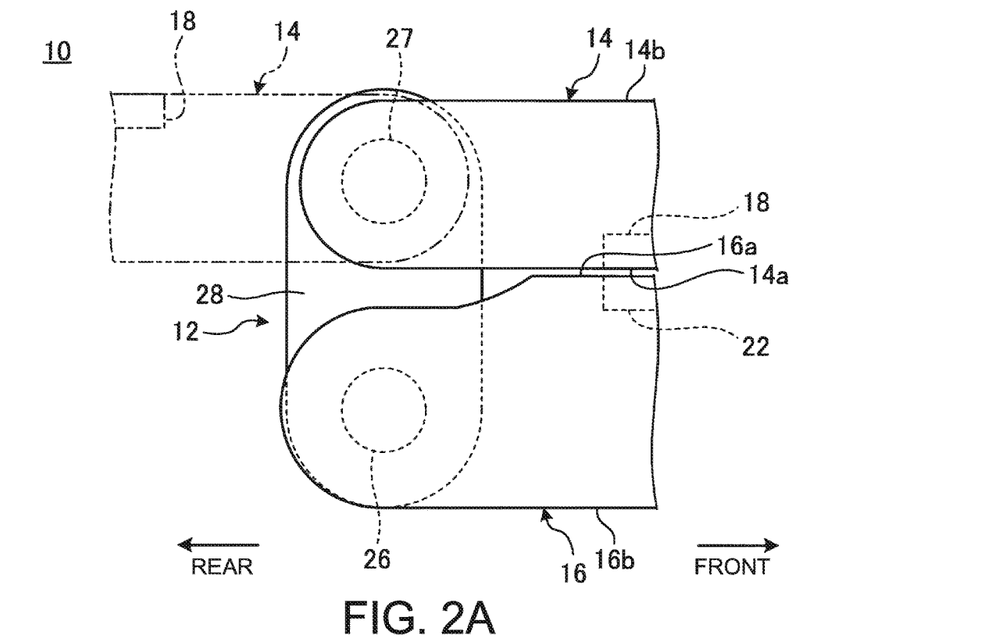
FIG. 2A is an essential part enlarged side view schematically illustrating one example of a state of closing a display chassis from a state illustrated in FIG. 1.
Figure 2B:
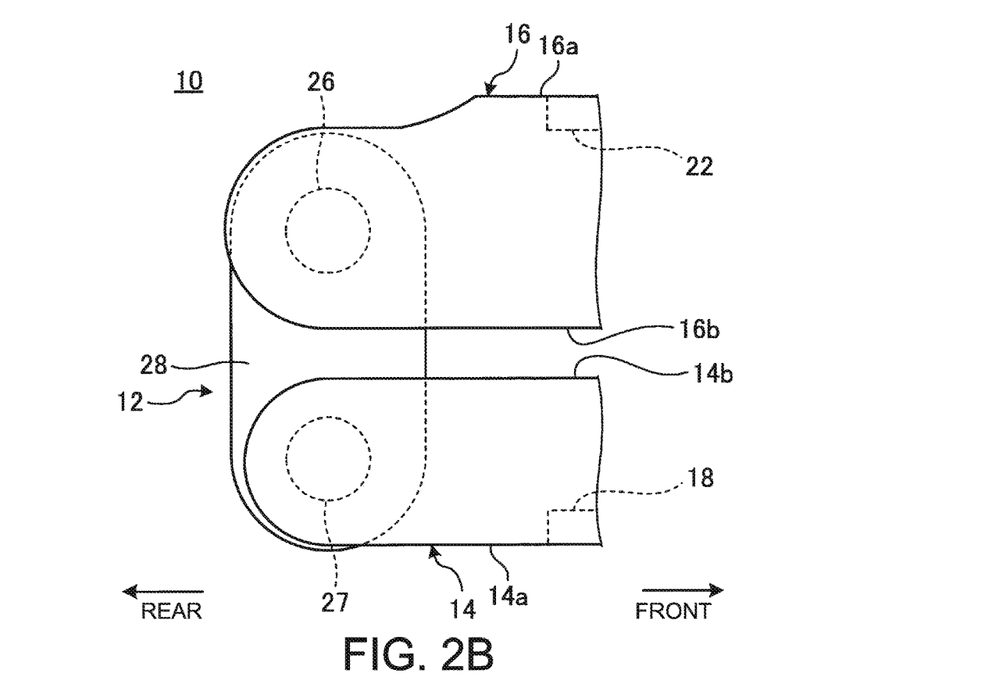
FIG. 2B is an essential part enlarged side view schematically illustrating one example of a state of further opening the display chassis from the state illustrated in FIG. 1 and then reversing the display chassis.

FIG. 1 is a perspective view illustrating one example of a portable information apparatus 10 according to one embodiment of the present invention. FIG. 1 illustrates a state where a display chassis 14 is opened upward and away from a main body chassis 16 via a hinge device 12 and thereby the portable information apparatus 10 is brought into a form of use as a Laptop PC. FIG. 2A is an essential part enlarged side view schematically illustrating one example of a state of closing the display chassis 14 from the state illustrated in FIG. 1. FIG. 2B is an essential part enlarged side view schematically illustrating one example of a state of further opening the display chassis 14 from the state illustrated in FIG. 1 and then reversing the display chassis 14.

The portable information apparatus 10 according to the present embodiment is a so-called convertible PC which is able to be preferably used as a Laptop PC in a state (a notes mode) where the display chassis 14 is rotationally moved to an angle position of around 90 degrees relative to the main body chassis 16 (see FIG. 1) and is able to be preferably used as a tablet PC in a state (a tablet mode) where the display chassis 14 is rotationally moved to a 360-degree position relative to the main body chassis 16 and is then reversed (see FIG. 2B). The portable information apparatus according to the present invention is preferably applicable to any electronic apparatus of a configuration that the two chassis are coupled together to be openable/closable such as, for example, a general Laptop PC that the display chassis 14 is rotationally moved only up to the 180-degree position, a cell phone, a smartphone, an electronic organizer and so forth in addition to such a convertible PC as described above.

In the following, description will be made by setting a form of the display chassis 14 which is in a state of being closed (a 0-degree position) relative to the main body chassis 16 as illustrated in FIG. 2A as a standard, and referring to the hinge device 12 side of the display chassis 14 and the main body chassis 16 as the rear (the rear end), referring to the opposite side thereof as the front (the front end), referring to a width direction as a left-right direction and referring to a thickness direction as an up-down direction.

In addition, for the convenience of description, in regard to the position of an angle of the display chassis relative to the main body chassis 16 via the hinge device 12, a posture that the display chassis 14 is brought into a completely closed state relative to the main body chassis 16, and an inner face 14a of the display chassis 14 faces an inner face 16a of the main body chassis 16 is referred to as the 0-degree position (see FIG. 2A). Then, description will be made by gradually changing the angle in a direction that the display chassis 14 is opened while rotationally moving the display chassis 14 with the 0-degree position being set as a standard. For example, a posture that the display chassis 14 and the main body chassis 16 are almost orthogonal to each other is referred to as a 90-degree position (see FIG. 1). A posture that the inner face 14a of the display chassis 14 and the inner face 16a of the main body chassis 16 are parallel with each other in a state of facing the same direction (upward) is referred to as the 180-degree position (see the display chassis 14 indicated by a two-point chain line in FIG. 2A). Further, a posture that an outer face 14b of the display chassis 14 faces an outer face 16b of the main body chassis 16 is referred to as the 360-degree position (see FIG. 2B). Incidentally, in regard to the angle positions such as the 0-degree position, the 90-degree position, the 180-degree position, the 360-degree position and so forth, it would naturally occur that angle positions which are slightly displaced from the accurate angle positions that numerical values of angles indicate are obtained because of the structure of the main body chassis 16, the display chassis 14 or the hinge device 12. Then, in the present embodiment the description will be made by referring to them as the 0-degree position and so forth including the above-described displaced angle positions.

As illustrated in FIG. 1, the portable information apparatus 10 is of the type that the rear-end part of the display chassis 14 and the rear-end part of the main body chassis 16 are coupled together via one pair of the left and right hinge devices 12 and 12 to be rotationally movable.

The display chassis 14 is configured into a flat-plate shape which is thinner than the main body chassis 16, and a display device 18 is disposed on the inner face 14a thereof. The display chassis 14 is electrically connected with the main body chassis 16 via a cable (wiring) 20 (see FIG. 3) which passes through each hinge device 12. The display device 18 is configured by, for example, a touch panel system liquid crystal display.

The main body chassis 16 is a casing which is configured into the flat-plate shape and a keyboard device 22, a touch pad 24 and so forth are disposed on the inner face 16a thereof. Various electronic components such as a substrate, an arithmetic device, a memory and so froth which are not illustrated in the drawing are housed in the main body chassis 16. The keyboard device 22 is, for example, a software keyboard and so forth which is displayed as a virtual keyboard on the touch panel system liquid crystal display.

Figure 3:
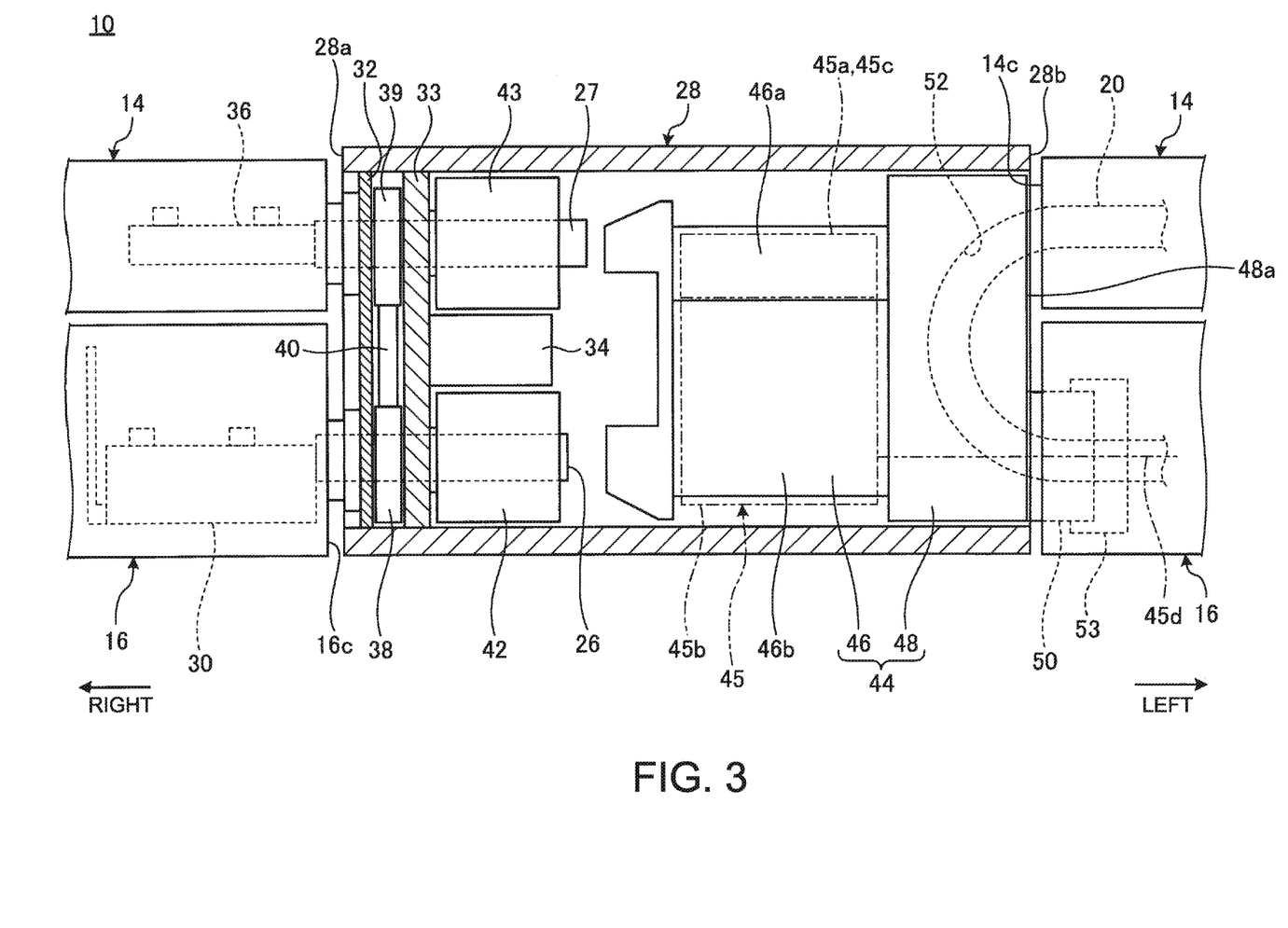
FIG. 3 is a partially sectional back face view schematically illustrating one example of a configuration of a hinge device and its vicinity of the portable information apparatus set at a 0-degree position.

FIG. 3 is a partially sectional back face view schematically illustrating one example of a configuration of the hinge device 12 and its vicinity of the portable information apparatus 10 which is at the 0-degree position.

As illustrated in FIG. 2A to FIG. 3, the hinge device 12 couples together the display chassis 14 and the main body chassis 16 to be rotationally movable from the 0-degree position to the 360-degree position by a two-shaft structure. The hinge device 12 includes a first hinge shaft 26, a second hinge shaft 27 and a hinge chassis 28. Incidentally, the left and right hinge devices 12 and 12 have the same structure except for the point that they have bilaterally symmetric structures. Although details will be described later, an antenna device 45 is housed and disposed in the hinge chassis 28 of each of the left and right hinge devices 12 and 12 (see FIG. 1). The antenna device 45 may be disposed in only one of the left and right hinge devices 12. In a case where the portable information apparatus 10 concerned is the general Laptop PC and so forth that only rotational movement from the 0-degree position to the 180-degree position is possible, the hinge device 12 is configured to have only the second hinge shaft 27, not having, for example, the first hinge shaft 26.

As illustrated in FIG. 3, the first hinge shaft 26 is a rotating shaft which extends in the left-right direction and is coupled to be nonrotatable relative to the main body chassis 16. A one-end part (a left-end part in FIG. 3) of the first hinge shaft 26 projects from a one-side part 28a (a left-side part in FIG. 3) of the hinge chassis 28 and is coupled and fixed to the main body chassis 16 via a support bracket 30. Thereby, the first hinge shaft 26 rotates integrally with the main body chassis 16. An other-end part (a right-end part in FIG. 3) of the first hinge shaft 26 is held by support plates 32 and 33 which are disposed side by side in the left-right direction in the hinge chassis 28 to be rotatable. The support plates 32 and 33 are structured integrally with an attaching rod 34 which is disposed on the center of the support plate 33 and are fixed to the hinge chassis 28 via the attaching rod 34. The support plates 32 and 33 are thin plates having external shapes which almost match a shape (the shape that both upper and lower ends of a rectangle are formed into arc shapes) of an inner space in the hinge chassis 28.

Accordingly, the main body chassis 16 is supported to be rotatable relative to the hinge chassis 28 together with the first hinge shaft 26. In other words, the hinge chassis 28 is supported to be rotatable relative to the main body chassis 16 via the first hinge shaft 26.

As illustrated in FIG. 3, the second hinge shaft 27 is a rotating shaft which extends in the left-right direction and is coupled to be nonrotatable relative to the display chassis 14. A one-end part (a left-end part in FIG. 3) of the second hinge shaft 27 projects from the one-side part 28a (the left-side part in FIG. 3) of the hinge chassis 28, and is coupled and fixed to the display chassis 14 via a support bracket 36. Thereby, the second hinge shaft 27 rotates integrally with the display chassis 14. The other-end part (the right-end part in FIG. 3) of the second hinge shaft 27 is held by the support plates 32 and 33 to be rotatable in the hinge chassis 28.

Accordingly, the display chassis 14 is supported to be rotatable relative to the hinge chassis 28 together with the second hinge shaft 27. In other words, the hinge chassis 28 is supported to be rotatable relative to the display chassis 14 via the second hinge shaft 27.

As illustrated in FIG. 2A to FIG. 3, the hinge chassis (a hinge block) 28 is a resinous tubular member which supports the first and second hinge shafts 26 and 27 to be rotatable. The hinge chassis 28 has the sectional shape that both the upper and lower ends of the rectangle are formed into the arc shapes. The hinge chassis 28 is disposed to be rotatable in recessed parts 14c and 16c formed in rear-end parts of the display chassis 14 and the main body chassis 16 respectively (see FIG. 3). The support plates 32 and 33 which support the first and second hinge shafts 26 and 27 to be rotatable are press-fitted into hollow parts in the hinge chassis 28 respectively, and the attaching rod 34 is screwed and fixed to the hinge chassis 28. The hinge chassis 28 is rotatable relative to the main body chassis 16 and the display chassis 14 via the first and second hinge shafts 26 and 27.

As illustrated in FIG. 3, the hinge device 12 has a first disk 38 which is fitted on and fixed to the first hinge shaft 26, and a second disk 39 which is fitted on and fixed to the second hinge shaft 27. The first and second disks 38 and 39 are disposed between the support plates 32 and 33. A float pin 40 is disposed at a position between outer circumference faces of the first disk 38 and the second disk 39. The float pin 40 is reciprocally movable and rotatable between the first disk 38 and the second disk 39.

The float pin 40 selectively fits into a groove which is not illustrated in the drawing and is formed in the outer circumference face of the first disk 38 or a groove which is not illustrated in the drawing and is formed in the outer circumference face of the second disk 39 in accordance with the position of the opening angle of the display chassis 14 relative to the main body chassis 16. Thereby, rotation of the shaft (the first hinge shaft 26 or the second hinge shaft 27) into which the float pin 40 fits is regulated and either the first hinge shaft 26 or the second hinge shaft 27 is made selectively rotatable in accordance with the position of the opening angle of the display chassis 14. In the present embodiment, only the second hinge shaft 27 is rotated at the positions from the 0-degree position to the 180-degree position, and only the first hinge shaft 26 is rotated at the positions from the 180-degree position to the 360-degree position, and thereby smooth opening and closing operations of the display chassis 14 are made possible (see FIG. 2A and FIG. 2B). A rotating shaft selection function by the float pin 40 may be omitted. In addition, the portable information apparatus 10 according to the present invention may be also configured so that, for example, a gear train which is not illustrated in the drawing is interposed between the first hinge shaft 26 and the second hinge shaft 27 to rotate both the first and second hinge shafts 26 and 27 simultaneously.

As illustrated in FIG. 3, a first torque generation mechanism 42 and a second torque generation mechanism 43 are disposed in the hinge chassis 28. The first torque generation mechanism 42 is fitted on the first hinge shaft and makes the first hinge shaft 26 generate a predetermined rotational torque. The second torque generation mechanism 43 is fitted on the second hinge shaft and makes the second hinge shaft 27 generate the predetermined rotational torque. Thereby, the opening and closing operations between the display chassis 14 and the main body chassis 16 are performed stably and smoothly with a certain amount of rotational torque being exerted.

Figure 4:
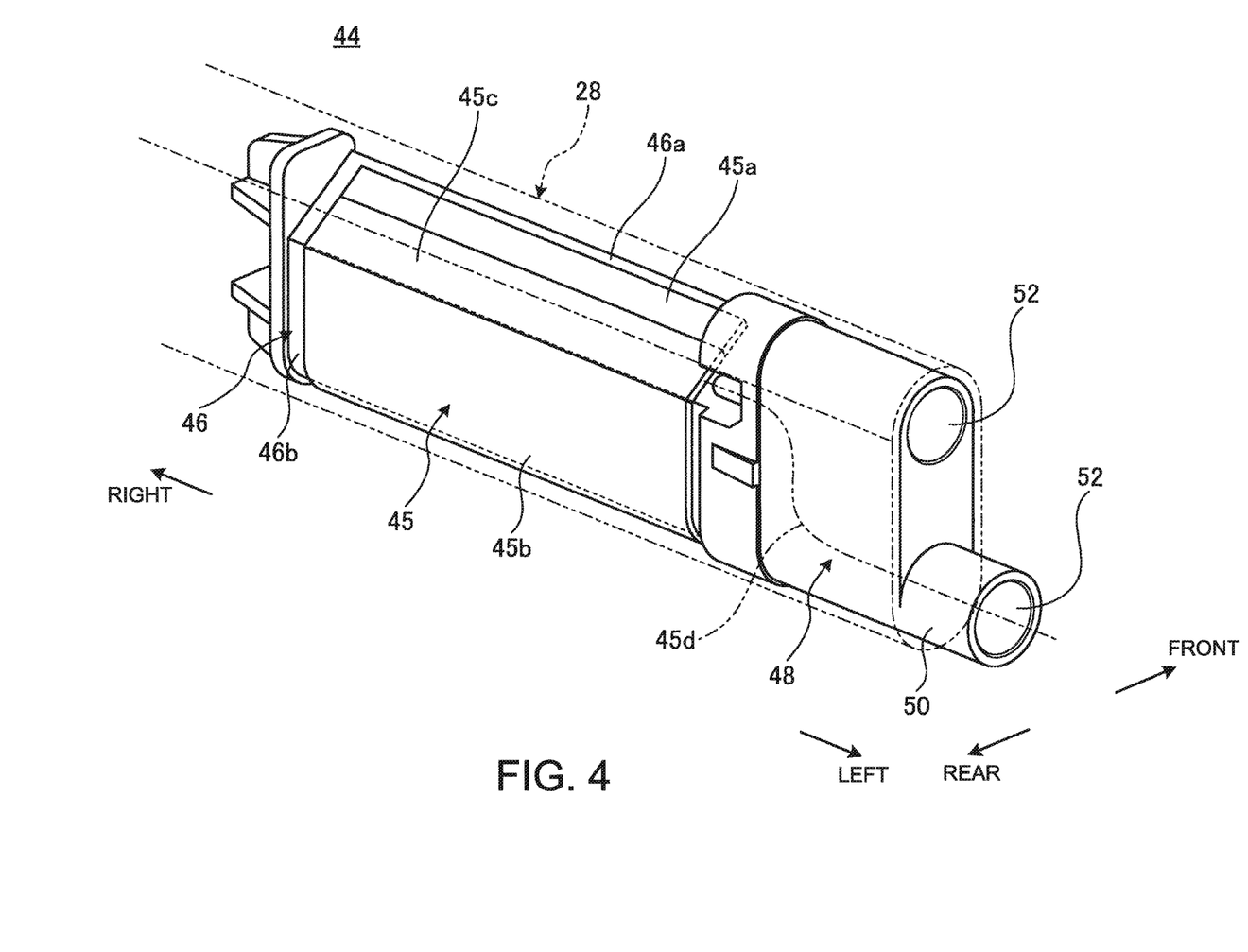
FIG. 4 is a perspective view illustrating one example of a holder.

As illustrated in FIG. 3, a holder (a holder component) 44 is housed and fixed in the hinge chassis 28. The holder 44 is the component adapted to dispose the antenna device 45 in the hinge chassis 28. FIG. 4 is a perspective view illustrating one example of the holder 44.

As illustrated in FIG. 3 and FIG. 4, the holder 44 is the resinous blockish component which extends in the longitudinal direction (the left-right direction) of the hinge chassis 28 and is press-fitted and fixed in the hinge chassis 28. In the right hinge device 12 illustrated in FIG. 3, the first and second hinge shafts 26 and 27 project from the one-side part 28a on the right (the left in FIG. 3) of the hinge chassis 28. Thus, the holder 44 is disposed on the left (the right in FIG. 3) of the first and second hinge shafts 26 and 27 side by side with the first and second hinge shafts 26 and 27 in the hinge chassis 28. Incidentally, the left hinge device 12 has a structure which is bilaterally symmetric to the structure of the right hinge device 12.

The holder 44 has an antenna support section 46 and a holder base 48.

The antenna support section 46 is the section which attaches and supports the antenna device 45. The antenna support section 46 is the blockish section which is disposed in the inner space of the hinge chassis 28 in a state of forming a gap above it. The antenna support section 46 has a first support face 46a and a second support face 46b sticking of the partially bent antenna device 45 to which is possible. The first support face 46a is the inclined face which is inclined gradually downward from the front toward the rear in the inner space of the hinge chassis 28. The second support face 46b is the face which extends downward contiguously to a rear lower end of the first support face 46a and then is bent and extends forward.

The antenna device 45 is the antenna for various wireless communications such as, for example, a wireless LAN, a wireless WAN and so forth of the portable information apparatus 10 concerned. In the present embodiment, for example, a planar inverted F antenna (PIFA) which is a small-sized film-shaped antenna is used as the antenna device 45.

As illustrated in FIG. 4, the antenna device 45 has an antenna element 45a, a ground element 45b, a power supply section 45c and an antenna cable 45d. The antenna element 45a and the ground element 45b are provided on, for example, a flexible circuit board by screen printing and so forth. The antenna element 45a is a conductive section which serves as a communication section which performs transmission and reception of radio waves. The ground element 45b is a conductive section which serves as the ground of the antenna device 45. The power supply section 45c is the section which is disposed between the antenna element 45a and the ground element 45b and to which the antenna cable 45d is connected. The antenna cable 45d is wiring which electrically connects the antenna device 45 with a communication circuit and so forth in the main body chassis 16 and is used for signal transmission and reception by the antenna element 45a and power supply to the antenna device 45. The antenna cable 45d is configured by, for example, a coaxial cable. In this case, an inner line of the coaxial cable is connected to a power supply point and an outer (surrounding) line of the coaxial cable is also connected to the ground element 45b.

In the antenna device 45, the antenna element 45a and the power supply section 45c are formed into flat plate shapes, a boundary part between the power supply section 45c and the ground element 45b is bent, and the ground element 45b is formed into a partially bent shape. The antenna element 45a and the power supply section 45c are disposed on the first support face 46a of the holder 44 and the ground element 45b is disposed on the second support face 46b of the holder 44.

The holder base 48 is an attaching section of the holder 44 to the hinge chassis 28. The holder base 48 is a blockish section of a shape which almost matches the shape (the shape that both the upper and lower ends of the rectangle are formed into the arc shapes) of the inner space in the hinge chassis 28. The holder base 48 is located on the side of the antenna support section 46 which is opposite to the side that the first and second hinge shafts 26 and 27 are disposed and is disposed on the other-side part 28b (the right part in FIG. 3) opposite to the one-side part 28a of the hinge chassis 28. That is, an outer-side face 48a of the holder base 48, which is opposite to the side that the antenna support section 46, is disposed faces on an opening in the other-side part 28b of the hinge chassis 28.

The holder base 48 is provided with a support shaft 50. The support shaft 50 is projectingly disposed on the outer-side face 48a of the holder base 48 and projects from the other-side part 28b of the hinge chassis 28. The support shaft 50 is disposed coaxially with the first hinge shaft 26 and a leading end of the support shaft 50 is pivotally supported by a bearing section 53 in the main body chassis 16. The support shaft 50 is a rotating shaft which is coaxial with the first hinge shaft 26 and supports the other-side part 28b of the hinge chassis 28 which is integrated with the support shaft 50 via the holder 44 to be rotatable relative to the main body chassis 16. The holder base 48 is also provided with a cable path 52 along which the cable 20 is cabled from the display chassis 14 side toward the main body chassis 16 side in an almost U-shaped form. The cable path 52 passes through the support shaft 50. Also, the antenna cable 45d is inserted into the cable path 52.

Figure 5A:
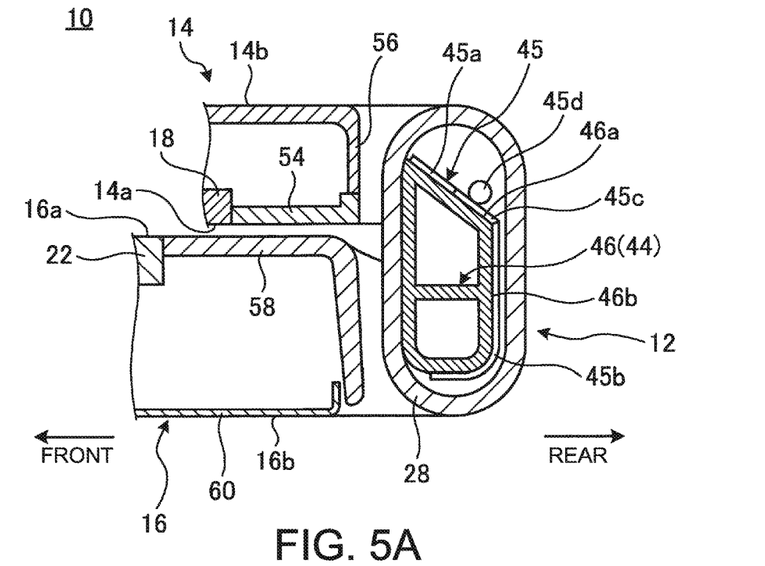
FIG. 5A is a side sectional diagram schematically illustrating one example of a state of an antenna device in a hinge chassis at the 0-degree position.
Figure 5B:
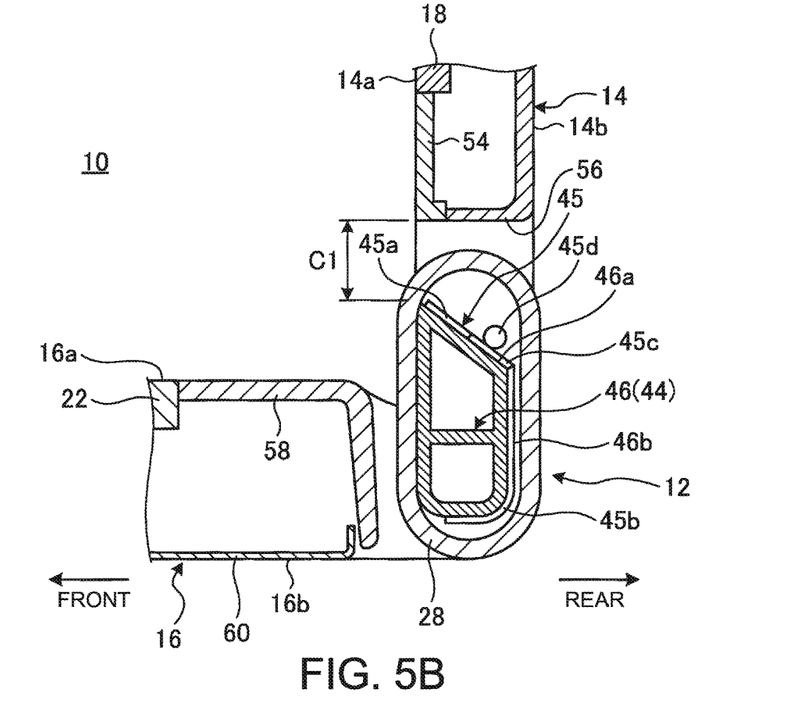
FIG. 5B is a side sectional diagram schematically illustrating one example of a state of the antenna device in the hinge chassis at a 90-degree position.
Figure 5C:
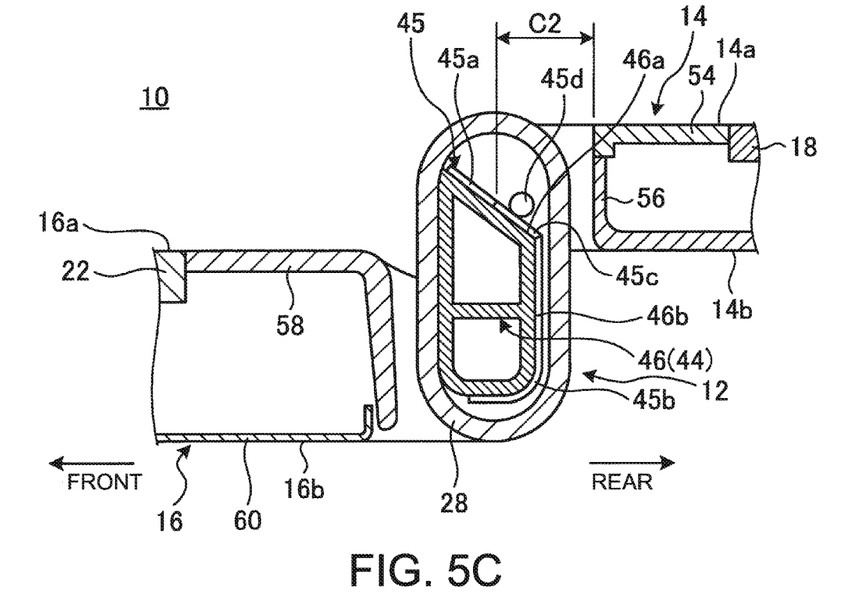
FIG. 5C is a side sectional diagram schematically illustrating one example of a state of the antenna device in the hinge chassis at a 180-degree position.
Figure 5D:
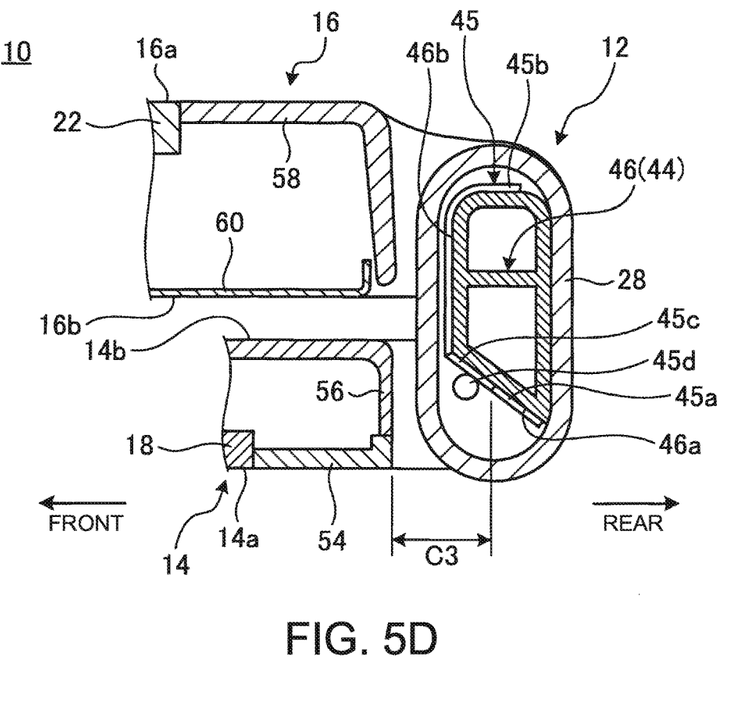
FIG. 5D is a side sectional diagram schematically illustrating one example of a state of the antenna device in the hinge chassis at a 360-degree position.

Then, a relation among a specific attaching posture of the antenna device 45 to the hinge chassis 28, the opening/closing angle between the display chassis 14 and the main body chassis 16, and arrangement of the antenna device 45 will be described. FIG. 5A is a side sectional diagram schematically illustrating one example of a state of the antenna device 45 in the hinge chassis 28 at the 0-degree position, FIG. 5B illustrates one example of a state of the antenna device 45 in the hinge chassis 28 at the 90-degree position, FIG. 5C illustrates one example of a state of the antenna device 45 in the hinge chassis 28 at the 180-degree position and FIG. 5D illustrates one example of a state of the antenna device 45 in the hinge chassis 28 at the 360-degree position.

It is preferable to dispose the antenna element 45a of the antenna device 45 by leaving a space which is larger than a predetermined space (in the following, referred to as a "space C") between the conductor such as metal and so forth and the antenna element 45a in order to ensure the stable communication quality of the antenna device 45. Incidentally, although this minimum space C differs depending on the specifications of the antenna device 45 and the portable information apparatus 10, the space is set to about 3 to 4 mm, for example, in a 2.4 GHz band wireless LAN antenna which is loaded on the general convertible PC and Laptop PC. Accordingly, in the portable information apparatus 10 according to the present embodiment, it is preferable to typically secure the space which is larger than the space C in the notes mode and the tablet mode between the antenna device 45 disposed in the hinge chassis 28 and each of the conductors used in the display chassis 14 and the main body chassis 16.

First, in the present embodiment, the inner face 14a side of the display chassis 14 is configured by the display device 18 which is the conductor and a resinous bezel member 54 which is a nonconductor and the outer face 14b side of the display chassis 14 is configured by a metal cover member 56 which is the conductor as illustrated in FIG. 5A. On the other hand, the inner face 16a side of the main body chassis 16 is configured by the keyboard device 22 which is the conductor, and a resinous bezel member 58 which is the nonconductor, and the outer face 16b side of the main body chassis 16 is configured by a metal cover member 60 which is the conductor. Therefore, the conductors which are disposed close to the hinge chassis 28 are the cover member 56 in the display chassis 14 and the cover member 60 in the main body chassis 16. Accordingly, in the antenna device 45, it is preferable to typically separate the antenna element 45a from the cover members 56 and 60 in the notes mode and the tablet mode by leaving the space which is larger than the space C.

Then, the hinge chassis 28 which houses the antenna device 45 has a sectional shape whose longitudinal direction extends along a direction (the up-down direction) that the display chassis 14 and the main body chassis 16 mutually overlap at the 0-degree position that the display chassis 14 and the main body chassis 16 are in an overlappingly closed state as illustrated in FIG. 2A and FIG. 5A. Incidentally, in the present embodiment, the longitudinal direction of the sectional shape of the hinge chassis 28 is the direction which extends along the direction that the display chassis 14 and the main body chassis 16 mutually overlap at the 0-degree position, along a direction that the first and second hinge shafts 26 and 27 are disposed side by side (see FIG. 2A), and along a front-back direction from a rear-end part on the hinge device 12 side of the display chassis 14 to a front-end part thereof on the opposite side at the 90-degree position (see FIG. 5B).

In the antenna device 45, the antenna element 45a and the power supply section 45c are stuck and fixed to the first support face 46a of the holder 44 and the ground element 45b is stuck and fixed to the second support face 46b of the holder 44.

Thereby, in the antenna device 45, the antenna element 45a is disposed on an upper part in the hinge chassis 28 and is disposed in a posture of being inclined relative to the longitudinal direction (the up-down direction) of the sectional shape of the hinge chassis 28 (the posture of being inclined at an angle of about 45 degrees in FIG. 5A). That is, the antenna element 45a is disposed in the posture of being inclined gradually downward from the leading end side thereof toward the power supply section 45c side thereof while gradually going from the front to the rear of the antenna device 45. On the other hand, the ground element 45b is formed contiguously to the power supply section 45c which is formed contiguously to the antenna element 45a to be bent in a vertical direction and then is bent forward on a lower part in the hinge chassis 28, and a leading end of the ground element 45b extends down to a position below the antenna element 45a. That is, the ground element 45b is disposed in the posture of gradually going downward from the power supply section 45c side thereof toward the leading end side thereof on the opposite side and then going forward.

Accordingly, in the portable information apparatus 10 concerned, the antenna element 45a is disposed on the upper part in the hinge chassis 28 and is disposed at a position which is closer to the cover member 56 of the display chassis 14 than to the cover member 60 of the main body chassis 16 (see FIG. 5A to FIG. 5D). Therefore, it is preferable to dispose the antenna element 45a in a state of leaving a space which is larger than the space C between the antenna element 45a and the cover member 56 of the display chassis 14.

On this point, in the portable information apparatus 10 concerned, the antenna element 45a is disposed in the posture of being inclined relative to the longitudinal direction of the sectional shape of the hinge chassis 28. Thereby, in a case where the display chassis 14 is set to the 90-degree position which is illustrated in FIG. 5B and indicates the notes mode, a space C1 which is larger than the space C is secured between the antenna element 45a and the cover member 56. In addition, in a case where the display chassis 14 is set to the 180-degree position illustrated in FIG. 5C, a space C2 which is larger than the space C1 is secured between the antenna element 45a and the cover member 56. Further, in a case where the display chassis 14 is set to the 360-degree position which is illustrated in FIG. 5D and indicates the tablet mode, a space C3 which is equivalent to the space C2 is secured between the antenna element 45a and the cover member 56. Incidentally, as apparent from illustrations in FIG. 5B to FIG. 5D, the space which is larger than the space C is typically secured between the antenna element 45a and the cover member 60 of the main body chassis 16. Consequently, in the portable information apparatus 10 concerned, it is possible to ensure the stable communication quality of the antenna device 45 in all forms of use.

Figure 6A:
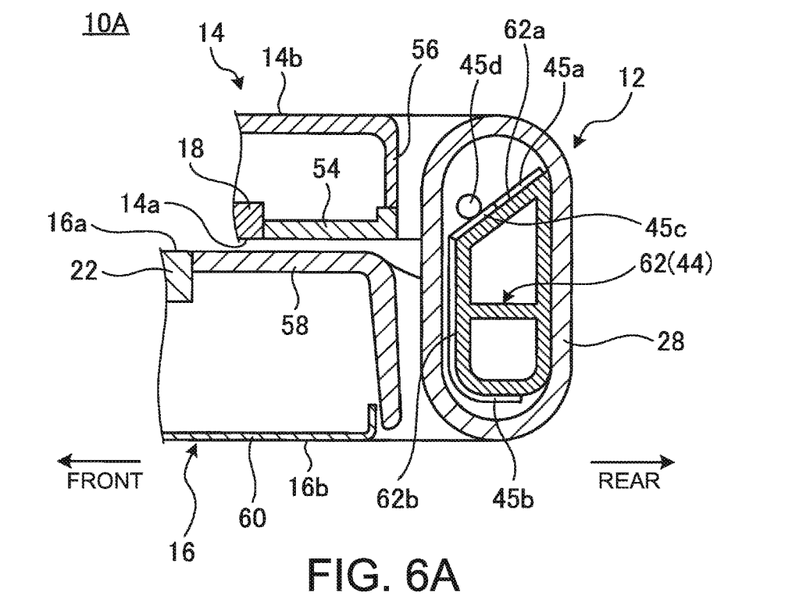
FIG. 6A is a side sectional diagram schematically illustrating one example of a state of the antenna device in the hinge chassis at the 0-degree position in a portable information apparatus according to a modified example.
Figure 6B:
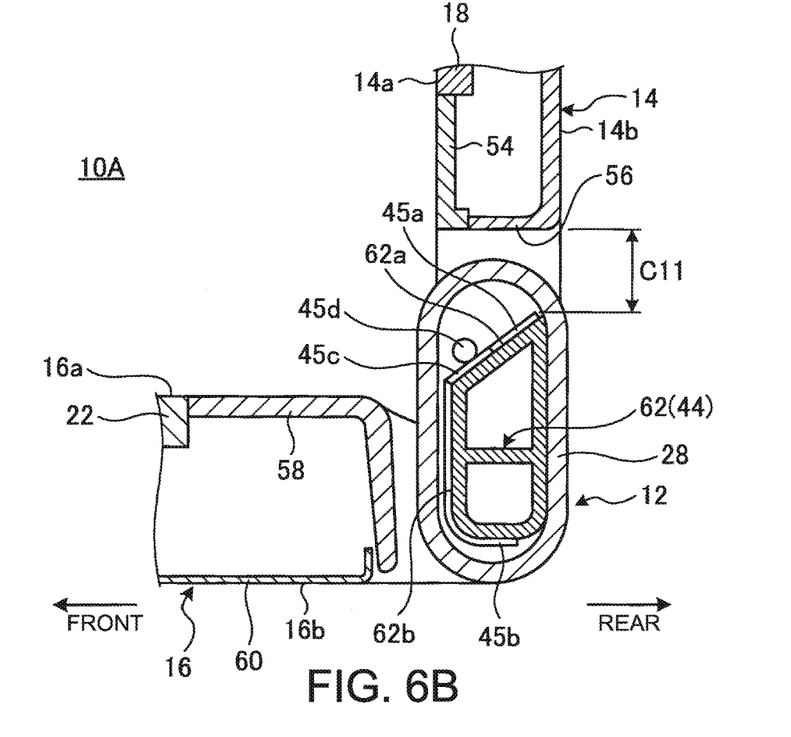
FIG. 6B is a side sectional diagram schematically illustrating one example of a state of the antenna device in the hinge chassis at the 90-degree position in the portable information apparatus illustrated in FIG. 6A.
Figure 6C:
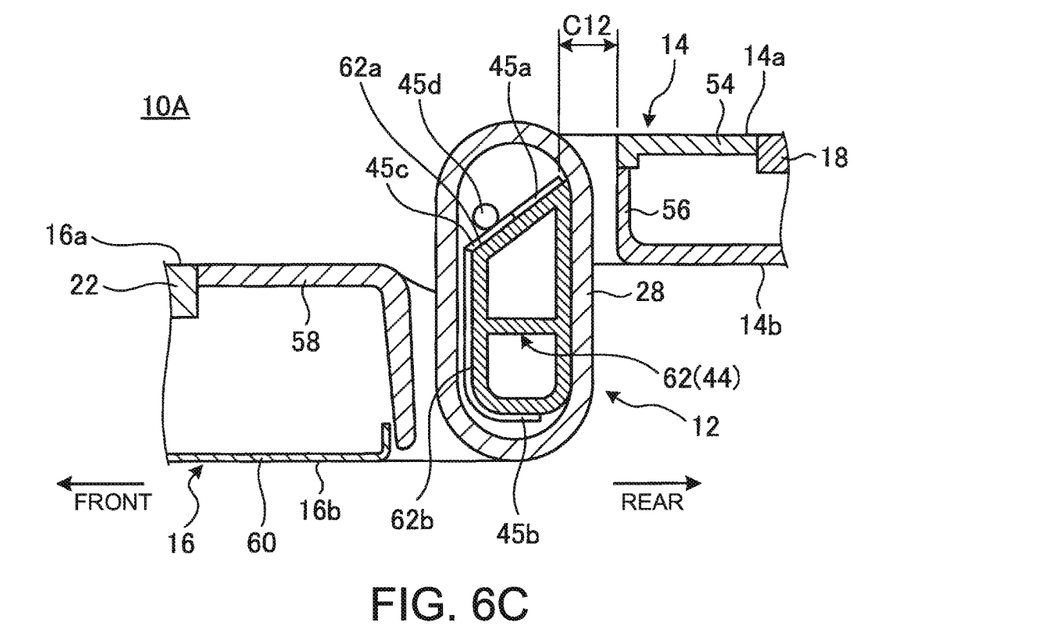
FIG. 6C is a side sectional diagram schematically illustrating one example of a state of the antenna device in the hinge chassis at the 180-degree position in the portable information apparatus illustrated in FIG. 6A.
Figure 6D:
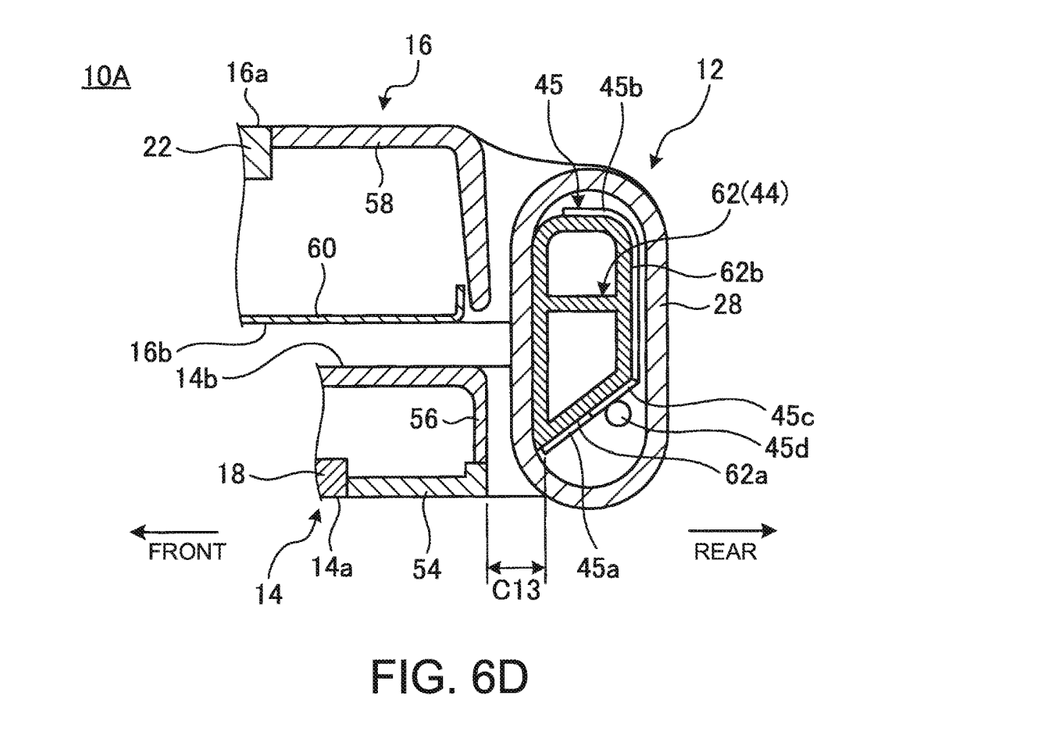
FIG. 6D is a side sectional diagram schematically illustrating one example of a state of the antenna device in the hinge chassis at the 360-degree position in the portable information apparatus illustrated in FIG. 6A.

FIG. 6A is a side sectional diagram schematically illustrating one example of a state of the antenna device 45 in the hinge chassis 28 at the 0-degree position in a portable information apparatus 10A according to a modified example, FIG. 6B illustrates one example of a state of the antenna device 45 at the 90-degree position, FIG. 6C illustrates one example of a state of the antenna device 45 at the 180-degree position, and FIG. 6D illustrates one example of a state of the antenna device 45 at the 360-degree position.

The portable information apparatus 10A illustrated in FIG. 6A to FIG. 6D is different from the above-described portable information apparatus 10 in that the antenna device 45 is disposed in the hinge chassis 28 by using the holder 44 having an antenna support section 62 which is configured into a shape which is bilaterally symmetric to the shape of the antenna support section 46 illustrated in FIG. 5A to FIG. 5D.

As illustrated in FIG. 6A, the antenna support section 62 has a first support face 62a and a second support face 62b which are formed into shapes which are bilaterally symmetric to the shapes of the first support face 46a and the second support face 46b of the above-described antenna support section 46 respectively. In the antenna device 45, the antenna element 45a and the power supply section 45c are stuck and fixed to the first support face 62a, and the ground element 45b is stuck and fixed to the second support face 62b.

Thereby, in the portable information apparatus 10A concerned, the antenna element 45a of the antenna device 45 is disposed on an upper part in the hinge chassis 28 and is disposed in a posture of being inclined relative to the longitudinal direction of the sectional shape of the hinge chassis 28 (the posture of being inclined at the angle of about 45 degrees in FIG. 6A). In this occasion, the antenna element 45a is disposed in the posture of being inclined gradually downward from the leading end side thereof toward the power supply section 45c side thereof, while gradually going from the rear to the front of the antenna device 45. On the other hand, the ground element 45b is formed contiguously to the power supply section 45c which is formed contiguously to the antenna element 45a to be bent in a vertical direction and then is bent rearward on a lower part in the hinge chassis 28, and a leading end thereof extends down to a position bellow the antenna element 45a. That is, the ground element 45b is disposed in the posture of gradually going downward from the power supply section 45c side thereof toward the leading end side thereof on the opposite side and then going rearward.

Accordingly, in the portable information apparatus 10A concerned, the antenna element 45a is disposed on the upper part in the hinge chassis 28 and is disposed at a position which is closer to the cover member 56 of the display chassis 14 than to the cover member 60 of the main body chassis 16 (see FIG. 6A to FIG. 6D). Therefore, also in the portable information apparatus 10A, it is preferable to dispose the antenna element 45a in a state of leaving a space which is larger than the space C between the antenna element 45a and the cover member 56 of the display chassis 14.

On this point, in the portable information apparatus 10A concerned, the antenna element 45a is disposed in the posture of being inclined relative to the longitudinal direction of the sectional shape of the hinge chassis 28. Thereby, in a case where the display chassis 14 is set to the 90-degree position which is illustrated in FIG. 6B and indicates the notes mode, a space C11 which is larger than the space C is secured between the antenna element 45a and the cover member 56. In addition, in a case where the display chassis 14 is set to the 180-degree position illustrated in FIG. 6C, a space C12, which is slightly smaller than the space C11 and is larger than the space C, is secured between the antenna element 45a and the cover member 56. Further, in a case where the display chassis 14 is set to the 360-degree position which is illustrated in FIG. 6D and indicates the tablet mode, a space C13, which is equivalent to the space C12, is secured between the antenna element 45a and the cover member 56. Incidentally, as apparent from illustrations in FIG. 6B to FIG. 6D, the space which is larger than the space C is typically secured between the antenna element 45a and the cover member 60 of the main body chassis 16. Consequently, also in the portable information apparatus 10A concerned, it is possible to ensure the stable communication quality of the antenna device 45 in all forms of use.

However, in the portable information apparatus 10 illustrated in FIG. 5A to FIG. 5D, in a case where the display chassis 14 is rotationally moved from the 0-degree position toward the 360-degree position, the cover member 56 of the display chassis 14 is moved in a direction that the cover member 56 gradually goes away from the antenna element 45a. In contrast, in the portable information apparatus 10A illustrated in FIG. 6A to FIG. 6D, in a case where the display chassis 14 is rotationally moved from the 0-degree position toward the 360-degree position, the cover member 56 of the display chassis 14 is moved in a direction that the cover member 56 gradually comes close to the antenna element 45a. Therefore, the portable information apparatus 10 illustrated in FIG. 5A to FIG. 5D is more advantageous than the portable information apparatus 10A illustrated in FIG. 6A to FIG. 6D in order to more surely stabilize the communication quality of the antenna device 45. In other words, the portable information apparatus 10 has such an advantage that even in a case where the whole apparatus is miniaturized by making the space between the antenna element 45a and the cover member 56 small, it is easier for the portable information apparatus 10 to secure the spaces C1 to C3 which are larger than the space C than for the portable information apparatus 10A.

As described above, the portable information apparatus 10 (10A) according to the present embodiment has the configuration that the main body chassis 16 and the display chassis 14 are coupled together via the hinge device 12 to be openable/closable. In this case, the hinge device 12 includes the hinge chassis 28 having the sectional shape whose longitudinal direction extends along the direction that the display chassis 14 and the main body chassis 16 mutually overlap in the state of overlappingly closing the display chassis 14 and the main body chassis 16 and the hinge shafts 26 and 27 which couple together the main body chassis 16 and the hinge chassis 28 and together the display chassis 14 and the hinge chassis 28 respectively. The antenna device 45 having the antenna element 45a is housed and disposed in the hinge chassis 28. In addition, the antenna element 45a is disposed in the posture of being inclined relative to the longitudinal direction of the sectional shape of the hinge chassis 28.

The antenna element 45a is disposed in the posture of being inclined relative to the longitudinal direction of the sectional shape of the hinge chassis 28 in this way. Thereby, it is possible to typically secure the spaces which are larger than the predetermined space C between the antenna element 45a and the display chassis 14 and between the antenna element 45a and the main body chassis 16 respectively irrespective of the opening/closing angle between the display chassis 14 and the main body chassis 16. Thereby, it is possible to ensure the communication quality of the antenna device 45. In addition, the necessity to dispose the antenna device 45, for example, in the bezel member 58 of the display chassis 14 is eliminated by disposing the antenna device 45 in the hinge device 12. Consequently, it is possible to configure the bezel member 58 as narrow as possible and thereby the appearance quality of the product (the portable information apparatus) is improved. Further, the antenna device 45 does not overlap the main body chassis 16 in the tablet mode by disposing the antenna device 45 in the hinge device 12. Consequently, it is not necessary to secure nonconductor parts used for ensuring the communication quality of the antenna device 45 in the tablet mode for the bezel member 58 and, in particular, the cover member 60 of the main body chassis 16. Thereby, it is possible to avoid the increase in manufacturing cost, the reduction in chassis strength of the main body chassis 16, the reduction in appearance quality of the portable information apparatus and so forth.

In addition, since in the portable information apparatus 10 (10A) concerned, the antenna element 45a is disposed in the above-described inclined state in the hinge chassis 28, it is possible to sufficiently secure a distance ranging from the leading end of the antenna element 45a to the leading end of the ground element 45b via the power supply section 45c in the narrow and small hinge chassis 28 and it is possible to sufficiently secure the area for installation of the ground element 45b. Thereby, it is possible to ensure sufficient grounding performance without frame-grounding the ground element 45b to the display chassis 14 and the main body chassis 16. Therefore, the portable information apparatus 10 (10A) concerned is able to be effectively utilized, in particular, in a configuration provided with the hinge device 12 of the two-shaft structure that the hinge chassis 28 is coupled to the display chassis 14 and the main body chassis 16 to be rotationally movable.

In the portable information apparatus 10 (10A) concerned, the hinge device 12 has the first hinge shaft 26 which couples together the main body chassis 16 and the hinge chassis 28 to be rotatable, and the second hinge shaft 27 which couples together the display chassis 14 and the hinge chassis 28 to be rotatable, and the antenna element 45a is disposed in the posture of being inclined relative to the direction that the first and second hinge shafts 26 and 27 are disposed side by side. That is, in a case where the shape of the hinge device 12 of the two-shaft structure is to be miniaturized, the sectional shape of the hinge device 12 is formed into the shape that the longitudinal direction thereof extends in the direction that the first and second hinge shafts 26 and 27 are disposed side by side. Therefore, it is possible to dispose the antenna device 45 in the hinge chassis 28 while ensuring the communication quality and the sufficient grounding performance of the antenna device 45 by disposing the antenna element 45a in the posture of being inclined relative to the direction that the first and second hinge shafts 26 and 27 are disposed side by side.

In the portable information apparatus 10 (10A) concerned, the display chassis 14 and the main body chassis 16 have the flat-plate shapes which extend in the front-back directions from the rear-end parts thereof on the hinge device 12 side toward the front-end parts thereof on the opposite side respectively and the antenna element 45a is disposed in the posture of being inclined relative to the front-back directions of the display chassis 14 and the main body chassis 16 in a state of being set to the 90-degree position that the front-back directions of the display chassis 14 and the main body chassis 16 are orthogonal to each other. That is, even in a case where the antenna element 45a is configured to assume the posture of being inclined relative to the front-back directions of the display chassis 14 and the main body chassis 16 in a state where the display chassis 14 and the main body chassis 16 are set to the 90-degree position, it is possible to secure with ease the spaces which are larger than the predetermined space C between the antenna element 45a and the display chassis 14 and between the antenna element 45a and the main body chassis 16, for example, as illustrated in FIG. 5A to FIG. 5D. Thereby, it is possible to ensure the sufficient communication quality of the antenna device 45 regardless of the forms of use.

In the portable information apparatus 10 (10A) concerned, the hinge device 12 has at least the second hinge shaft 27 which couples together the display chassis 14 and the hinge chassis 28 to be rotationally movable, and the antenna element 45a is disposed at the position which is closer to the display chassis 14 than to the main body chassis 16 in the hinge chassis 28. That is, in the Laptop PC and the convertible PC having each the display chassis 14 equipped with the display device 18 and the main body chassis 16 equipped with the keyboard device 22, in general, the main body chassis 16 is placed on the desktop and so forth and the display chassis 14 is disposed upright on the main body chassis 16 in the notes mode. Then, it is possible to dispose the antenna element 45a at a position separated from the desktop and so forth which serves as the ground face of the portable information apparatus 10 (10A) concerned by disposing the antenna element 45a at the position close to the display chassis 14 which is disposed on the main body chassis 16. Therefore, it is possible to more improve the communication quality of the antenna device 45.

That is, in the portable information apparatus 10 (10A), the antenna device 45 has the ground element 45b, and the ground element 45b is disposed at the position which is closer to the main body chassis 16 than to the display chassis 14 in the hinge chassis 28. Thereby, it is possible to dispose the ground element 45b at the position which is close to the desktop and so forth which serves as the ground face of the portable information apparatus 10 (10A). Therefore, it is possible to more improve the communication quality of the antenna device 45.

In the portable information apparatus 10 (10A) concerned, the holder 44, adapted to hold the antenna device 45, is housed and fixed in the hinge chassis 28, the holder 44 has the first support face 46a (62a) which is disposed in the state of being inclined relative to the longitudinal direction of the sectional shape of the hinge chassis 28, and the antenna element 45a is fixed to the first support face 46a (62a). Thereby, it is possible to surely fix the antenna device 45 in a desirable posture in the hinge chassis 28.

Incidentally, it goes without saying that the present invention is not limited to the above-described embodiment and is able to be modified and altered freely within a range not deviating from the gist of the present invention.

Although in the above-described embodiment, the configuration that the flat-plate shaped antenna element 45a is disposed in the inclined posture in the hinge chassis 28 is exemplified, the antenna element 45a may be formed into a bent shape and a curved shape. In addition, the inclined posture of the antenna element 45a relative to the hinge chassis 28 may be a posture other than the postures illustrated in FIG. 5A to FIG. 6D.

The invention claimed is:

1. A portable information apparatus having a first chassis and a second chassis coupled together via a hinge device to be openable/closable, wherein:
   the hinge device includes a hinge chassis having a sectional shape whose longitudinal direction extends along a direction that the first chassis and the second chassis mutually overlap in a state of being overlappingly closed, and at least one hinge shaft which couples together at least one of the first chassis and the second chassis and the hinge chassis to be rotatable, and
   an antenna device which has an antenna element is housed and disposed in the hinge chassis, and the antenna element is inclined relative to the longitudinal direction of the hinge chassis.

2. The portable information apparatus according to claim 1, wherein:
   the hinge device has a first hinge shaft which couples together the first chassis and the hinge chassis to be rotatable, and a second hinge shaft which couples together the second chassis and the hinge chassis to be rotatable, and
   the antenna element is inclined relative to a direction that the first hinge shaft and the second hinge shaft are disposed side by side.

3. The portable information apparatus according to claim 1, wherein:
   the first chassis and the second chassis have flat-plate shapes which extend in front-back directions from ends on the hinge device side toward ends on the opposite side, and
   the antenna element is inclined relative to the front-back directions of the first chassis and the second chassis in a state where the first chassis and the second chassis are set to a 90-degree position so that the mutual front-back directions of the first chassis and the second chassis are orthogonal to each other.

4. The portable information apparatus according to any one of claim 1, wherein:
   the first chassis is a main body chassis having a keyboard device,
   the second chassis is a display chassis having a display device,
   the hinge device has the hinge shaft which couples together at least the display chassis and the hinge chassis to be rotatable, and
   the antenna element is is closer to the display chassis than to the main body chassis in the hinge chassis.

5. The portable information apparatus according to claim 4, wherein:
   the antenna device has a ground element, and
   the ground element is closer to the main body chassis than to the display chassis in the hinge chassis.

6. The portable information apparatus according to claim 1, wherein:
   a holder component adapted to hold the antenna device is housed and fixed in the hinge chassis, and
   the holder component has a support face which is inclined relative to the longitudinal direction of the hinge chassis, and the antenna element is fixed to the support face.

7. The portable information apparatus according to claim 5, wherein:
   a holder component adapted to hold the antenna device is housed and fixed in the hinge chassis, the holder component has a first support face which is inclined relative to the longitudinal direction of the hinge chassis, and a second support face is contiguous to the first support face and at least part of which is disposed along the longitudinal direction of the hinge chassis, and the antenna element is fixed to the first support face, and the ground element is fixed to the second support face.

8. A portable information apparatus having a first chassis and a second chassis coupled together via a hinge device to be openable/closable, wherein:

the hinge device includes a hinge chassis, a first hinge shaft which couples together the first chassis and the hinge chasses to be rotatable, and a second hinge shaft which couples together the second chassis and the hinge chassis to be rotatable, and an antenna device having an antenna element is housed and fixed in the hinge chassis, and the antenna element is inclined relative to a direction that the first hinge shaft and the second hinge shaft are disposed side by side.

9. A portable information apparatus having a first chassis and a second chassis coupled together via a hinge device to be openable/closable, wherein:

the hinge device includes a hinge chassis, a first hinge shaft which couples together the first chassis and the hinge chassis to be rotatable, and a second hinge shaft which couples together the second chassis and the hinge chassis to be rotatable, the first chassis and the second chassis have flat-plate shapes which extend in front-back directions from ends on the hinge device side toward ends on the opposite side, and an antenna device having an antenna element is housed and fixed in the hinge chassis, and the antenna element is inclined relative to the front-back directions of the first chassis and the second chassis in a state where the first chassis and the second chassis are set to a 90-degree position so that the mutual front-back directions of the first chassis and the second chassis are orthogonal to each other.

* * * * *